United States Patent [19]
Bril et al.

[11] Patent Number: 4,651,249
[45] Date of Patent: Mar. 17, 1987

[54] MAGNETIC HEAD HAVING A STEP-SHAPED GAP

[75] Inventors: Thijs W. Bril, Sunnyvale, Calif.; Pieter Dekker, Heerlen, Netherlands; Lambertus Postma; Cornelis H. M. Witmer, both of Eindhoven, Netherlands

[73] Assignee: U.S. Philips Corporation, New York, N.Y.

[21] Appl. No.: 816,683

[22] Filed: Jan. 3, 1986

Related U.S. Application Data

[63] Continuation of Ser. No. 463,201, Feb. 2, 1983, abandoned.

[30] Foreign Application Priority Data

Feb. 12, 1982 [NL] Netherlands ............... 8200530

[51] Int. Cl.⁴ .................................... G11B 5/23
[52] U.S. Cl. ................................................. 360/119
[58] Field of Search ....................... 360/119–121

[56] References Cited

U.S. PATENT DOCUMENTS 4,100,584  7/1978  Behr ........................... 360/119 X

FOREIGN PATENT DOCUMENTS 53-140016  6/1978  Japan ............................ 360/119
575680  11/1977  U.S.S.R. ........................ 360/119

*Primary Examiner*—A. J. Heinz
*Attorney, Agent, or Firm*—F. Brice Faller

[57] ABSTRACT

A magnetic head (1) having two core parts (2,3) of a magnetic material between which a non-magnetic transducing gap (4) is formed which has a central part (21) having a gap length which is selected to transduce the carrier frequency of a video signal and having a width which is defined by first and second side gaps (22,23) having gap lengths which are selected to suppress the carrier frequency of a video signal, the first and second side gaps (22,23) being bounded by indentations (7,8) in the sides of the core parts (2,3) and being filled with a material which bonds the two core parts (7,8) together.

4 Claims, 3 Drawing Figures

MAGNETIC HEAD HAVING A STEP-SHAPED GAP

This is a continuation of application Ser. No. 463,201, filed Feb. 2, 1983, now abandoned.

BACKGROUND OF THE INVENTION

The invention relates to a magnetic head having a core of a magnetic material which includes two spaced-apart core parts each having a width which is larger than the width of a recording/playback track, between which core parts a gap is formed the width of which is defined by first and second indentations extending from the respective side edges of the core parts.

Such a magnetic head is known from U.K. Patent Specification No. 1.593,310.

Magnetic recording and playback techniques have of late made significant progress, in particular in connection with improvement of the techniques for recording signals of extremely high frequencies as they are used in video recorders.

As is known, the video signal can be written on a magnetic tape in oblique tracks by means of two magnetic heads moving at high speed. In the VIDEO 2000 system, this is done by passing the tape at a speed of 2.44 cm/s in the form of a helix over 186° around a drum. The part of the drum to which the two magnetic heads present diametrically opposite to each other are connected, rotates at a circumferential speed of 5.08 m/s. In order to avoid, as far as the luminance signal is concerned, cross-talk between two tracks written one after the other, the gaps of the magnetic heads, which (viewed in the direction of movement) are 0.5 $\mu$m long and approximately 22 $\mu$m wide, are not placed perpendicular to the direction of movement. In fact, each gap makes an angle of 15° (the azimuth angle) with the normal to the direction of movement, the two writing gaps being shifted in opposite directions. As a result of this the tracks can be written on the tape without intermediate space.

Because it is undesirable both from a point of view of magnetic reluctance and from a point of view of handleability and mechanical rigidity to give the core of a video head a width which corresponds to the width of a video track (in the VIDEO 2000 system this width is slightly less than 22.6 $\mu$m), it is usual to make the core thicker (for example 150 $\mu$m) and to make indentations at the area of the gap in the edges of the core, which indentations between them define a gap of the desired width. The indentations can be made in known manner by means of laser methods or ion beam etching. A disadvantage of such a head construction is that the adhesion of the two core parts at the area of the tape contact face is produced only by the bonding means (usually glass) in the remaining part of the gap which has a width of a few tens of microns and a height of a few tens of microns. Although it is possible to also fill the indentations afterwards with glass, this has for its disadvantage that a second "glass bonding" process is necessary while moreover a type of glass having a lower softening temperature and an associated lower resistance to detrition than the glass in the gap are to be used.

Otherwise, whether the indentations are filled with glass or not, it is a disadvantage in both cases that, upon making the indentations which are large with respect to the dimensions of the gap, the positions of the ends of the gap are not exactly reproducible. The gap definition thus is not optimal.

SUMMARY OF THE INVENTION

It is therefore the object of the invention to provide a magnetic head having an improved core construction which does not exhibit the above-mentioned disadvantages.

For that purpose the magnetic head of the kind described in the opening paragraph is characterized according to the invention in that the gap has a central part having a gap length which is selected for transducing the carrier frequency of a video signal and having a width which is defined by first and second gaps having gap lengths which are selected for suppressing the carrier frequency of a video signal, said first and second gaps extending up to the respective indentations and being filled with a non-magnetically permeable material which bonds the two core parts together.

The inventive magnetic core construction having a "step-shaped" gap makes it possible to bond the two core parts together over a considerably larger area than in the known magnetic head, while nevertheless one "glass bonding" process will suffice in the manufacture.

More in particular this can be achieved in that one core part has a gap-bounding face which is flat while the other core part has a gap-bounding face in which channels of a defined depth are provided on either side of the central part by means of an etching process. During the manufacture, the two core parts are placed opposite to each other with the flat gap-bounding face and the gap-bounding face provided with channels in facing relationship in such manner that, in the center, a gap results having a desired gap length (of, for example, 0.3 $\mu$m). The central gap and the two side gaps—having, for example, a 10 times larger gap length—can then be filled with glass in one step.

In one embodiment, the channels are provided beside the central gap part by means of a reactive ion etching process as a result of which the first and second gaps present in the magnetic core have a substantially rectangular cross-section. This considerably increases the accuracy with which the width of the gap can be defined.

For special applications, the magnetic head according to the invention is characterized in that the central part of the gap has a width which is substantially equal to the width of the first and second gaps. A head is obtained with which it is possible, if a track is scanned by the central gap, to read long-wave track positioning information by means of the first and second gaps, which information is recorded in the tracks on either side. In a second embodiment, the length of the first and second gaps is for that purpose selected to reproduce tracking signals. By means of, for example, a laser, the indentations can be made in the edges of the core parts secured together, which indentations are necessary to ensure that the head during a reading operation does not read longwave tracking signals (so-called dynamic track following signals) of tracks which are not located immediately beside the followed track. However, the indentations now do not extend up to the write/read gap itself, so that the width thereof is exactly reproducible.

With a length of the first and second gaps of 10 $\mu$m (which is realizable by means of a reactive ion etching process) is associated, for example, a tracking signal having a wavelength of 50 $\mu$m.

BRIEF DESCRIPTION OF THE DRAWING

The invention will be described in greater detail with reference to the drawing.

DESCRIPTION OF THE PREFERRED EMBODIMENT

Figure 1:
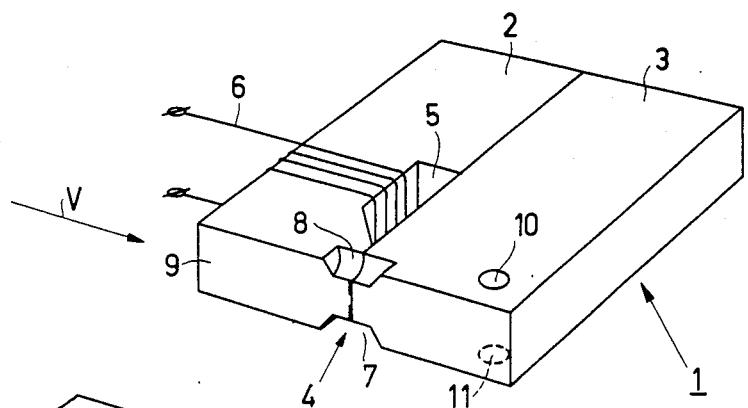
FIG. 1 is a perspective view of a magnetic head.
Figure 3:
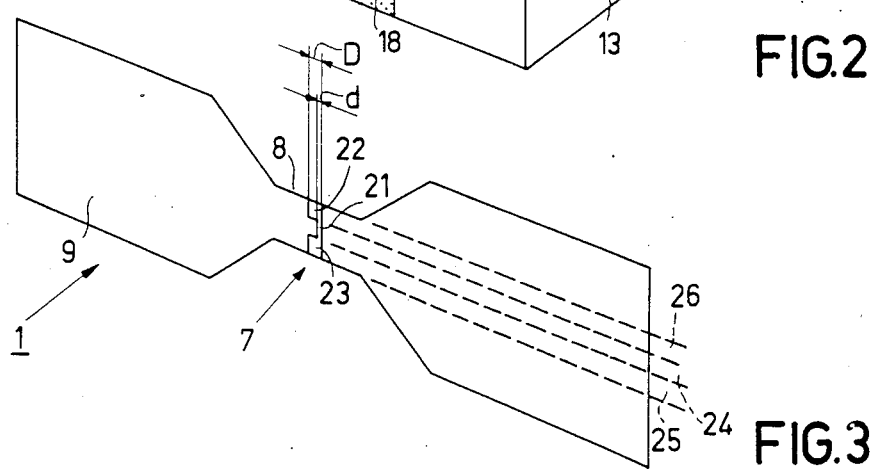
FIG. 3 shows diagrammatically the tape contact face of the magnetic head of FIG. 1.

FIG. 1 shows a magnetic head 1 according to the invention having two core parts of magnetic material 2,3 between which a non-magnetic gap area 4 is formed. Referring also to FIG. 3, gap area 4, which is bounded by indentations or recesses 7, 8 extending partly in the tape contact face 9 and partly in the side faces 10, 11 of the head 1, comprises a central area 21 having a length dimension d in the relative direction of movement V with respect to a magnetic tape which is selected for transducing the carrier frequency of a video signal. The width of the central gap area 21 is defined by the distance between two side gap areas 22 having a rectangular cross-section and having a considerably larger length dimension D (for example at least ten times larger than d) in the relative direction of movement V.

Figure 2:
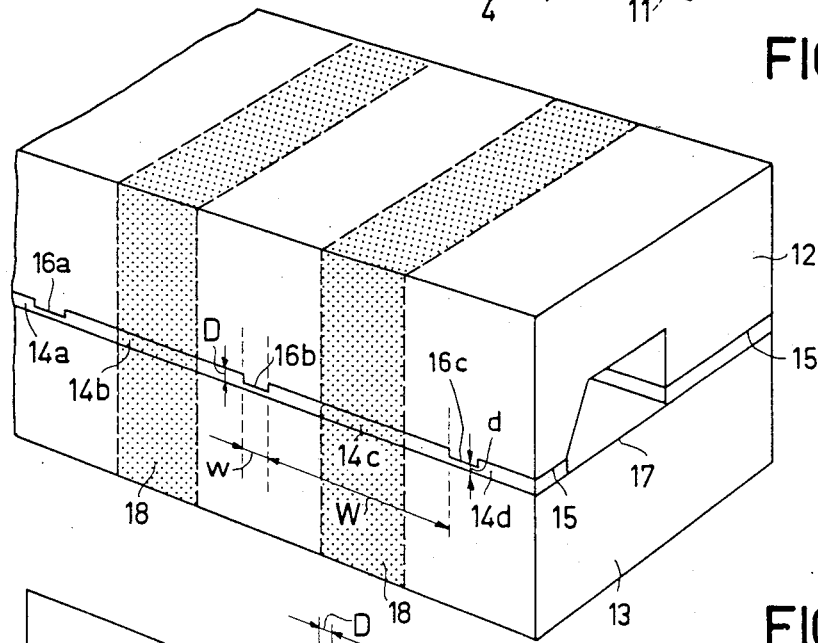
FIG. 2 shows an assembly of two blocks of core material.

Magnetic head 1 is formed from an assembly of two blocks of core material 12, 13 bonded together by means of glass (FIG. 2). Channels 14a, 14b, 14c, 14d... having a width W of approximately 500 μm and a depth D of approximately 10 μm have previously been etched in gap-bounding area 15 of block 12. In the case of which the core material is (monocrystalline) Mn—Zn ferrite, an effective method of etching channels 14a, 14b, 14c, 14d... with straight walls down to such a depth is ion etching in a reactive (chlorine-containing or bromine-containing) plasma, so-called reactive ion etching. A suitable plasma forms, for example, BCl₃. Comparatively high (0.5–5 W/cm²) sputtering powers are necessary. A useful mask material in this context is Al₂O₃ which is etched away 5 to 10 times less rapidly than Mn—Zn ferrite. "Ridges" 16a, 16b, 16c, ... remain between the channels 14a, 14b, 14c, 14d after etching and have a width w which corresponds to the track width of the system for which the magnetic heads are destined (approximately 20 μm). Core blocks 12, 13 are bonded together by means of glass which fills at least the channels 14a, 14b, 14c, 14d in such manner that the distance d of ridges 16a, 16b, 16c, ... of core block 12 to gap-bounding area 17 of core block 13 corresponds to the desired gap length (0.3 to 0.5 μm). An elegant method is to ensure that the mask material which covered the ridges in the etching process, after etching just has said thickness of 0.3 to 0.5 μm so that it can remain and may serve as a spacer. Alternatively, channels may be etched in both gap-bounding areas 15, 17. In order to obtain separate magnetic heads such as magnetic head 1 of FIG. 1, the assembly of core blocks 12, 13 is sawn into a number of slices after the bonding process. The saw-cuts are indicated by the shaded areas 18.

FIG. 3 which is a plan view of the tape contact face 9 of magnetic head 1 of FIG. 1 shows how the indentations 7, 8 which have been made by means of a laser define the width of gap area 4. Gap area 4 thus has a central part 21 having a gap length d (from 0.3 to 0.5 μm) for transducing luminance signals which part is flanked by side gap areas 22, 23 having a gap length D (of, for example, 10 μm) for suppressing luminance signals.

During operation the central gap area 21 is in a flux-coupling relationship with a signal track 24 on a magnetic tape. In order to be able to control the position of magnetic head 1 in such manner that gap area 21 cooperates only with track 24, the head 1 has gap areas 21, 22, 23 all having an equal width (for example, 22 μm, for a total distance of 66 μm between indentations 7, 8). Besides luminance signals, also tracking signals are written in the tracks 25, 26 immediately adjoining track 24 in a wavelength which is not suppressed by the gap areas 22, 23 but is just transduced. A tracking (or track positioning) signal having a wavelength of 50 μm can be transduced, for example, by a gap having a gap length D of 10 μm. The indentations 7,8 ensure that no tracking signals of tracks situated farther away can be transduced. As a result of the special design of the magnetic head according to the invention the laser beam during making the indentations 7, 8 remains remote from the central gap area 4, however, so that the definition of the central gap area 4 cannot be spoiled.

What is claimed is:

1. In a magnetic head for the reproduction and playback of video signals recorded on tracks on a magnetic tape, said video signals having a carrier frequency, track position signals also being recorded on said tracks, said magnetic head comprising a core of magnetic material having a tape contact face extending between first and second side faces, opposed recesses at the junction of said contact face with said first and second side faces to define a central region having a width in the direction normal to said first and second side faces that is less than the distance between said first and side faces, and a gap extending into said contact face across said central region; the improvement wherein said core is formed of two core parts spaced to define said gap, said gap being comprised of a pair of side gaps adjacent said recesses and a central gap extending between said side gaps, said two side gaps and and central gap having substantially equal dimensions at said contact face in said width direction, the length of said side gaps at said contact face in the length direction normal to said width direction being substantially greater than the length of said central gap in said length direction at said contact face, and a non-magnetic material in said central gap, said central gap having a length in said length direction enabling transducing of signals of said carrier frequency on a magnetic medium moving in said length direction along said contact face, said side gaps having lengths which suppress signals of said carrier frequency while enabling the reproduction of track position signals on a magnetic medium moving in said length direction along said contact face.

2. A magnetic head as claimed in claim 1, wherein the side gaps have lengths enabling reproducing track positioning signals having a wavelength in the order of magnitude of 50 micrometers.

3. A magnetic head as claimed in claim 1, wherein the the side gap lengths are at least 10 times as large the length of the central gap.

4. A magnetic head as claimed in claim 1, wherein the magnetic material of the core is Mn—Zn-ferrite and the non-magnetic material is Al₂O₃.

* * * * *